US007304981B2

(12) United States Patent
Yoon et al.

(10) Patent No.: US 7,304,981 B2
(45) Date of Patent: Dec. 4, 2007

(54) APPARATUS AND METHOD OF FLYWHEEL TIME-OF-DAY (TOD) SYNCHRONIZATION

(75) Inventors: Chang-June Yoon, Edison, NJ (US); Robert M. Wetstein, Nanuet, NY (US); Kaushik B. Patel, Bridgewater, NJ (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 1244 days.

(21) Appl. No.: 10/238,145

(22) Filed: Sep. 9, 2002

(65) Prior Publication Data

US 2004/0047307 A1    Mar. 11, 2004

(51) Int. Cl.
*H04J 3/06* (2006.01)
(52) U.S. Cl. ............... 370/350; 370/503; 370/324; 398/154; 455/502
(58) Field of Classification Search ............... 370/350, 370/316, 324, 503; 398/154; 455/502
See application file for complete search history.

(56) References Cited

U.S. PATENT DOCUMENTS

| 5,363,375 | A  | * | 11/1994 | Chuang et al. ............. 370/332 |
| 6,983,160 | B2 | * | 1/2006  | Drawert ....................... 455/502 |
| 2001/0039192 | A1 | | 11/2001 | Osterling et al. |
| 2002/0018402 | A1 | | 2/2002  | Egle et al. |
| 2002/0054611 | A1 | | 5/2002  | Seta |

FOREIGN PATENT DOCUMENTS

EP    0 991 216 A2    4/2000

OTHER PUBLICATIONS

"System Architecture Specification for the SUO SAS Networking Subsystem", Version 1.0, ITT A/CD, Jun. 8, 2000; pp. 2-19.
"Baseband Specification", Bluetooth, Version 1.1, Feb. 22, 2001, pp. 84-91.
"Wireless LAN Medium Access Control (MAC) and Physical Layer (PHY) Specifications", IEEE, 1999, pp. 9-20.
Radio Requirements Specification for Near Term Digital Radio Appendix A NTDR TRANSEC Specification, ITT, Aug. 29, 1997, pp. 12-23.
Chris Li et al., "SUO SAS Radio Intra-Networking Architecture", ITT A/CD, Oct. 2001, pp. 1-5.

* cited by examiner

*Primary Examiner*—Ricky Q. Ngo
*Assistant Examiner*—Chandrahas Patel
(74) *Attorney, Agent, or Firm*—RatnerPrestia

(57) ABSTRACT

A wireless communications network including multiple nodes, and a local node having GPS-based time for synchronization of time-of-day (TOD) in the network. The network includes at least the local node and a neighbor node communicating in the network. The local node includes a clock generator for generating a local TOD, and a time management unit, coupled to the clock generator, for adjusting the local TOD. A receiver in the local node receives from the neighbor node a message including a neighbor TOD. A counter in the local node computes and provides an integer value corresponding to a number of update values for synchronization of the neighbor TOD to the GPS-based time. A transmitter in the local node transmits to the neighbor node the integer value provided by the counter, whereby the time management unit adjusts the local TOD to the neighbor TOD and then transmits the adjusted local TOD and the integer value to the neighbor node for synchronization of the neighbor TOD to the GPS-based time.

19 Claims, 10 Drawing Sheets

APPARATUS AND METHOD OF FLYWHEEL TIME-OF-DAY (TOD) SYNCHRONIZATION

FIELD OF THE INVENTION

This invention relates, in general, to an apparatus and method of synchronizing time in a communications network and, more particularly, to a flywheel method of predicting, tracking and updating time by a node in a communications network as adjusted by other nodes in the communications network.

BACKGROUND OF THE INVENTION

In a tactical environment, RF communications may be protected from jamming and signal interception by periodically changing transmission frequency (either by frequency agility, direct sequence spread spectrum, or both) and encrypting transmitted data with a time dependent encryption algorithm. In order for two nodes to communicate with each other, they must be accurately synchronized in time.

In an ad hoc tactical network, the location and activation of radio network nodes may occur in a non-predictable and random manner. When the network employs direct sequence spread spectrum (DSSS) operation and time based encryption algorithms, it is essential that the nodes have a mechanism for discovering each other to synchronize their internal clocks. Furthermore, if a GPS knowledgeable node is present, the aggregate non-GPS based time is slowly pulled toward GPS based time in order to facilitate multi-tier operation. For the purpose of discovery, nodes that have no known neighbors (e.g. isolated nodes) may listen for a late net entry (LNE) signal from other nodes. After receiving the LNE signal, the nodes exchange time information and align each other with the same network time (e.g. become associated nodes). These nodes may also synchronize their network time with GPS based time, if available.

Because these nodes operate in a changing tactical environment, however, the members of an associated group of nodes may periodically lose and regain connectivity with each other. In the presence of a GPS knowledgeable node, which is causing the entire net of nodes to slowly gravitate toward GPS based time, unconnected nodes may be left in a state which cannot synchronize with other net members.

Wireless nodes employ clock synchronization techniques when operating in a wireless personal area network (WPAN) and a wireless local area network (WLAN). Bluetooth devices, which support low bandwidth and short distance communications, are examples of WPAN devices. For timing purposes, Bluetooth devices communicate and exchange data, by using master/slave clock synchronization methods which allow synchronization between node neighbors that are one-hop away from each other.

IEEE 802.11 WLAN standard specifies approaches for time synchronization of infrastructure-based networks and independent networks. For the infrastructure-based networks, IEEE 802.11 provides master/slave clock synchronization that uses a fixed node, the access point (AP), as a master. In an independent network, a mobile node transmits a beacon message with a chosen beacon period. Each receiving node updates its clock with the value in the received beacon message, if the received value is greater than its current local time. If the received value is less than the current local time, the received value is discarded.

One type of radio, known as the Near Term Data Radio (NTDR), manufactured by ITT, is an example of a tactical ad-hoc radio employing TOD synchronization. To assist synchronization with a common TOD, the radio uses three TOD message types (Cold Start, LNE and In-Net). In the Cold Start (CS) mode, the radio within the network uses a fixed TRANSEC. This permits the radio within the network to listen to CS messages without an initial TOD reference. Upon receiving a CS TOD update message, the radio extracts the transmitted time and uses it to update its own TOD. The radio then enters the LNE mode and selects a LNE TRANSEC, which is within 6 minutes from the In-Net TOD. The radio remains in LNE mode until it is within 20 msec of the transmitted time, after which it transitions into the In-Net mode. An In-Net message is then used for normal message transmission.

TOD synchronization of the NTDR is modified in another type of radio, known as the Small Unit Operation (SUO) radio, also manufactured by ITT. The basic functionality of CS, LNE and In-Net modes of the NTDR are replaced by functions of isolated, in-sync and associated modes employed in the SUO radio. One feature of the SUO radio is its TOD synchronization which allows a roaming node with local GPS to immediately synchronize with the current (non-GPS based) net time, and then slowly pull the net time toward the GPS based time.

A description of TOD synchronization follows. An isolated node devotes its resources to discovering and synchronizing time with its RF neighbor(s). To do this, the isolated node issues LNE signals at a high rate and periodically monitors the LNE channel for messages from other nodes. LNE signals are transmitted on the highest frequency channel available to the radio. The LNE signal uses a fixed code division multiple access (CDMA) spreading code and a fixed TRANSEC from the current key fill.

An associated node issues LNE signals at a low rate. Since all associated nodes issue LNE messages independently, an isolated node quickly detects a LNE signal, although associated nodes are issuing LNE messages at a low rate. After detecting an LNE message, the isolated node synchronizes with the associated nodes.

Messages, known as Packet Radio Organizational Packets (PROP), are used to discover new RF neighbors and exchange information for automatic transmission power (ATP) calculations. After a node completes TOD synchronization, it begins issuing PROP messages to identify other RF neighbors for establishing bi-directional communications.

FIGS. 1 and 2 illustrate TOD message transmission waveforms. FIG. 1 shows a TOD synchronization waveform that is transmitted by a node when it has isolated status. FIG. 2 shows a TOD synchronization waveform that is transmitted by the node when it has associated status.

An isolated node attempts to discover neighbors by listening for both the neighbor's LNE and RTS (request-to-send) transmissions. Since these two signals do not use the same spreading codes and frequencies, the transceiver is typically assigned to listen for one of these signals and the auxiliary receiver listens for the other. In a battery powered system, however, the use of two receiving devices is wasteful of power. In order to conserve power, the auxiliary receiver in an isolated node is placed into standby and the transceiver alternately switches between the frequencies and codes used for LNE and RTS. Since the transmitting station sends both an LNE and an RTS in an even epoch, followed later by the same transmission in an odd epoch, the single receiver approach detects the new RF neighbor, even if the epoch counters of the two nodes are out of phase with each other. This continues until the node becomes associated with its RF neighbors. During isolated status, PROP message (S1)

and LNE message (S2), as shown in FIG. 1 are selected randomly in order to minimize the possibility of other nodes being able to intercept a local node's emissions, and in order to avoid collision.

The NTDR system includes two TOD modes, namely a GPS based mode and a brigade-time-head (BTH) based mode. In the BTH based mode, the network TOD is anchored to a master clock (BTH time). If the BTH starts the network prior to arrival of a node having GPS based time, the network operates solely as a BTH network. If a node acquires GPS signals prior to the BHT starting the network, the network operates as a GPS based network. No solution exists to move a BTH network, or non-GPS based network, toward a GPS based network, after non-GPS based TOD time and GPS based time differ by more than one epoch (100 msec).

Conventional TOD synchronization in the SUO system is superior to that of the NTDR system, when operating in a volatile environment characterized by rapidly appearing/disappearing RF neighbors. Conventional TOD synchronization, nevertheless, leads to a fragmented communications network, in which one group of nodes may be synchronized to one TOD and another group of nodes may be synchronized to another TOD.

SUMMARY OF THE INVENTION

To meet this and other needs, and in view of its purposes, the present invention provides a wireless communications network including multiple nodes, and a local node having GPS-based time for synchronization of time-of-day (TOD) in the network. The network includes at least the local node and a neighbor node communicating in the network. The local node includes a clock generator for generating a local TOD, and a time management unit, coupled to the clock generator, for adjusting the local TOD. A receiver in the local node receives from the neighbor node a message including a neighbor TOD. A counter in the local node computes and provides an integer value corresponding to a number of update values for synchronization of the neighbor TOD to the GPS-based time. A transmitter in the local node transmits to the neighbor node the integer value provided by the counter, whereby the time management unit adjusts the local TOD to the neighbor TOD and then transmits the adjusted local TOD and the integer value to the neighbor node for synchronization of the neighbor TOD to the GPS-based time.

It is understood that the foregoing general description and the following detailed description are exemplary, but are not restrictive, of the invention.

BRIEF DESCRIPTION OF THE DRAWING

The invention is best understood from the following detailed description when read in connection with the accompany drawing. Included in the drawing are the following figures.

DETAILED DESCRIPTION OF THE INVENTION

The invention includes a flywheel time-of-day (TOD) synchronization method that is implemented in each node communicating in a network. Flywheel TOD synchronization includes each node formatting and transmitting TOD messages to another node in the network and, in turn, each node receiving TOD messages for predicting and updating its internal local clock.

Figure 3:
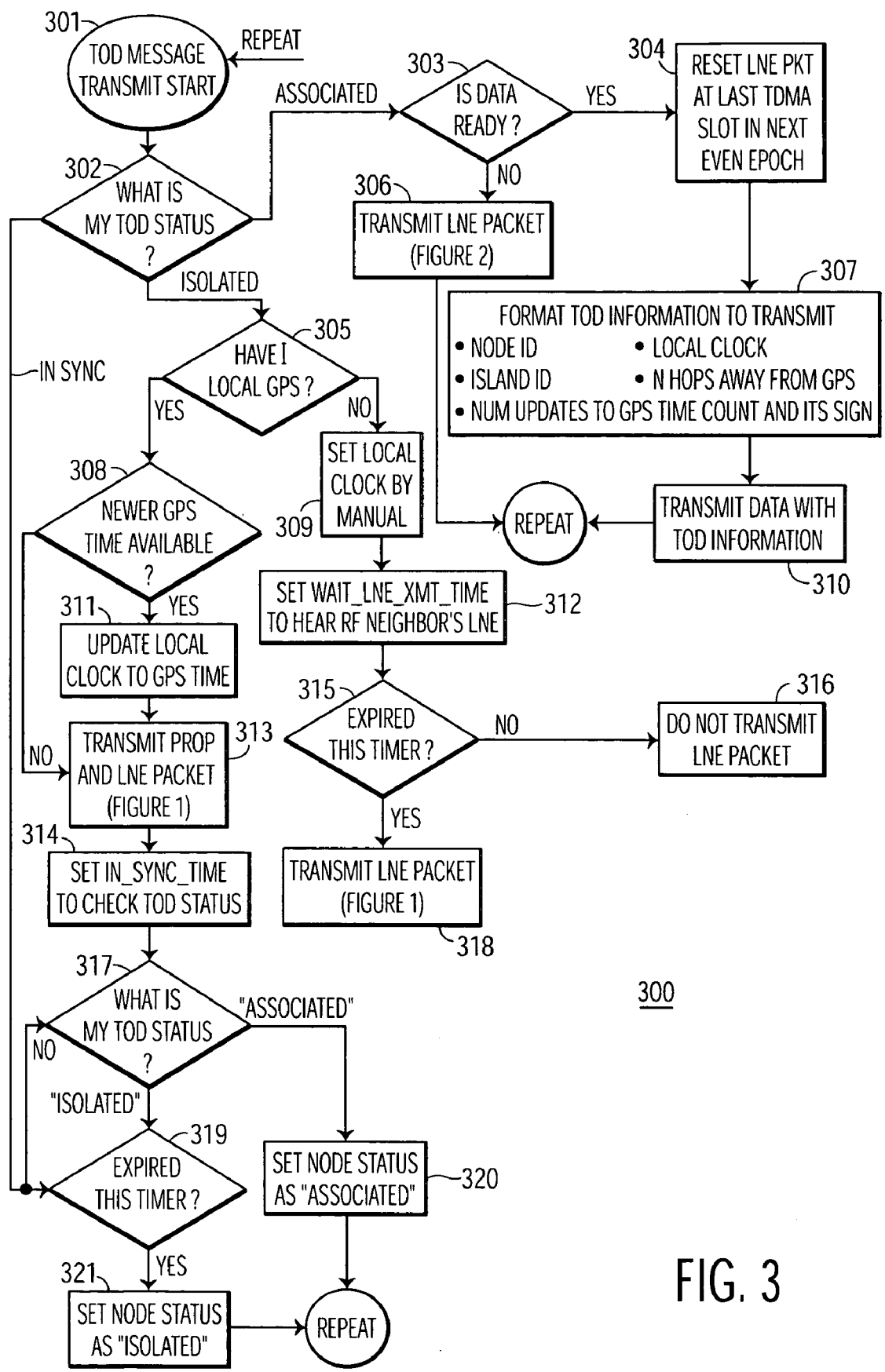
FIG. 3 is a flow diagram depicting a method of TOD packet transmission performed by a node in a network, in accordance with an embodiment of the invention.

An embodiment of the invention will now be described by referring first to FIG. 3 which illustrates a method of TOD packet transmission performed by each node in the network. The transmission method, generally designated as 300, starts at step 301 and determines whether the node is associated or isolated from other nodes in the network (step 302). If the node is in an associated status, the method branches to decision box 303 and either transmits an LNE packet (step 306), or resets the LNE packet at the last TDMA slot of the next even epoch (step 304) and then formats TOD information for transmission (step 307). The information formatted include (a) node ID (node identification), (b) island ID (network identification), (c) local clock (local TOD of node), (d) number of hops away from a node having GPS-based time, and (d) number of updates to GPS time count (an integer value, explained below). The formatted information is then transmitted in step 310. So long as the node is in the associated status, the method repeats these steps, as shown in FIG. 3.

Returning to step 302, if the method determines that the node is in an isolated status, the method further determines whether the node has GPS-based time (step 305). If the node has not GPS-based time, then the method does not transmit LNE signals, until a specified WAIT_LNE_XMT_TIME has expired (as determined by steps 309, 312, 315, 316 and 318).

If the method in step 305 determines that the node has GPS-based time, then the method updates the local clock of the node to GPS-based time and transmits PROP and LNE packets (as determined by steps 308, 311 and 313). A timer is set (step 314) to re-check the TOD status of the node as associated or isolated (steps 317, 319, 320 and 321). The method is repeated by looping back to step 301.

Figure 4:
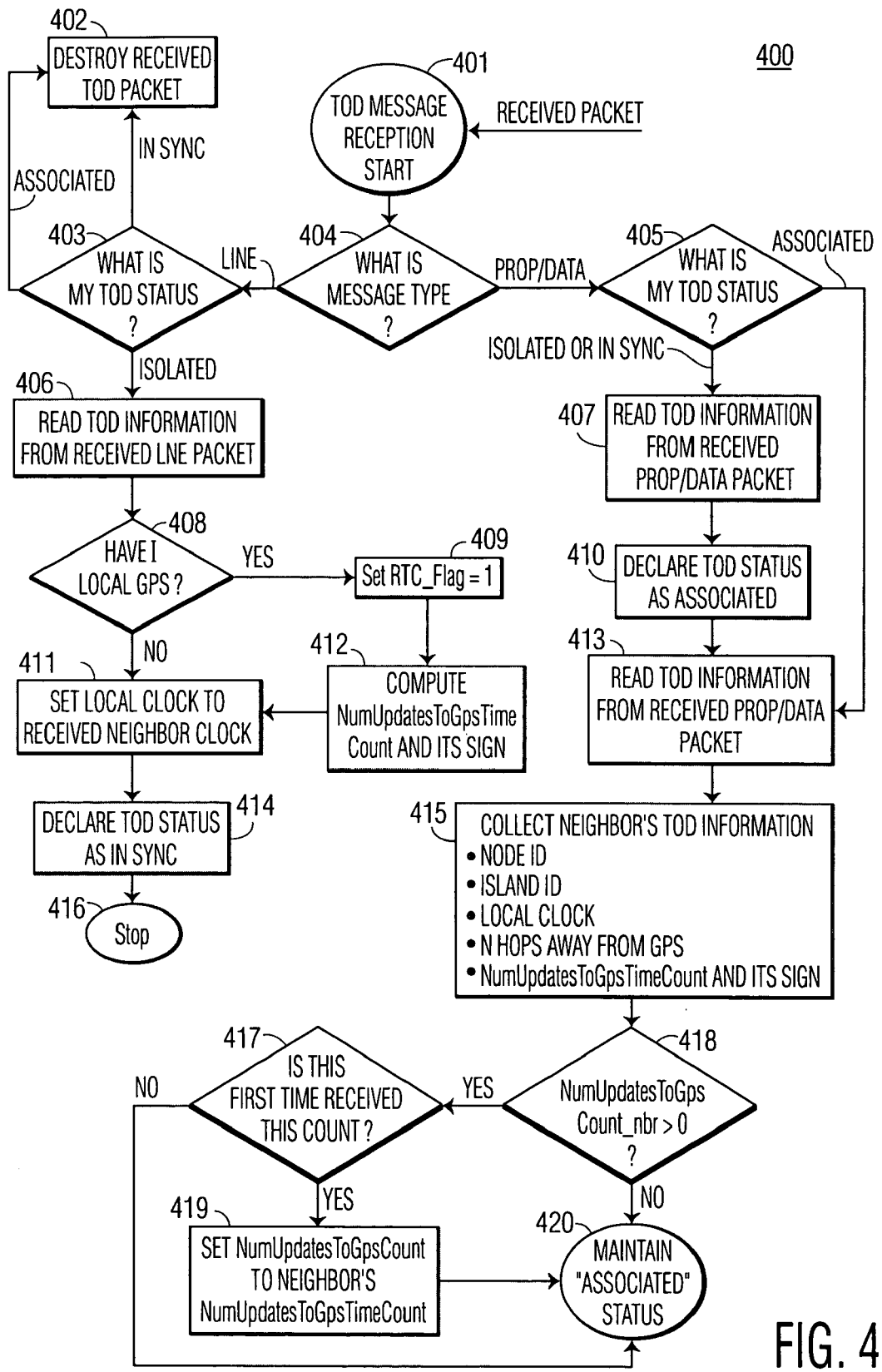
FIG. 4 is a flow diagram depicting a method of TOD packet reception performed by a node in a network, in accordance with an embodiment of the invention.

Referring next to FIG. 4, there is shown a method of TOD packet reception performed by each node in a network, in accordance with an embodiment of the invention. The reception method, generally designated as 400, starts at step 401 and identifies the message type received (step 404). If the message type received is a PROP or data, the method determines the TOD status of the node (step 405). After reading the received message, the method may declare the TOD status of the node as associated (steps 407, 410, 413 and 415). It will be appreciated that the message received by the node in step 415 may be the message transmitted by a neighbor node (shown in step 307 of FIG. 3).

In accordance with the invention, the method branches to step 418 and determines whether the "number of updates to GPS time count" received from the neighbor node is greater than zero (step 418). A number count greater than zero indicates that a node in the network has GPS-based time and is gradually attempting to pull the network's non-GPS based TOD toward the GPS-based time.

If the method determines, on the other hand, that the received count value is zero (step 418), indicating there is no-pulling activity in the network, the method branches to step 420 and performs TOD maintenance (explained below with reference to FIG. 5). If the received count value, received for the first time, is greater than zero, the method sets the count value of the node (own node) to the received count value (steps 417, 418 and 419). For example, if the received "number of updates to GPS time count" has a value of 15, then method 400 sets the node's own "number of updates to GPS time count" to the value of 15. The method then branches to step 420 and performs TOD maintenance (as explained below).

Completing the description of FIG. 4, if the received message type is LNE, the method branches to step 403 and determines the TOD status of the node. If the node's own TOD status is in-sync or associated, the method ignores the received TOD packet (step 402). If the node's own TOD status is isolated, and the node does not have local GPS-based time, the method sets the node's local clock to the received neighbor's local clock (steps 403, 406, 408, 411, 414 and 416).

If the method, on the other hand, determines that the node has GPS-based time (step 408), the RTC_flag is set to 1 (step 409). It will be appreciated that when the RTC_flag is set to 1, the node is in the process of pulling the TOD of other nodes in the network toward the node's own GPS-based time.

After setting the RTC_flag to 1, the method computes an integer value of the "number of updates to GPS time count" and its sign (step 412). A positive sign may indicate, for example, that the GPS-based time leads the received neighbor's local clock. A negative sign may indicate, for example, that the GPS-based time lags the received neighbor's local clock. The integer value is computed using equation (1), discussed below. After computing the integer value in step 412, the method sets the node's own local clock to the received neighbor's clock (step 411) and declares that its own TOD status is in-sync with the neighbor's TOD (step 414).

Figure 1:
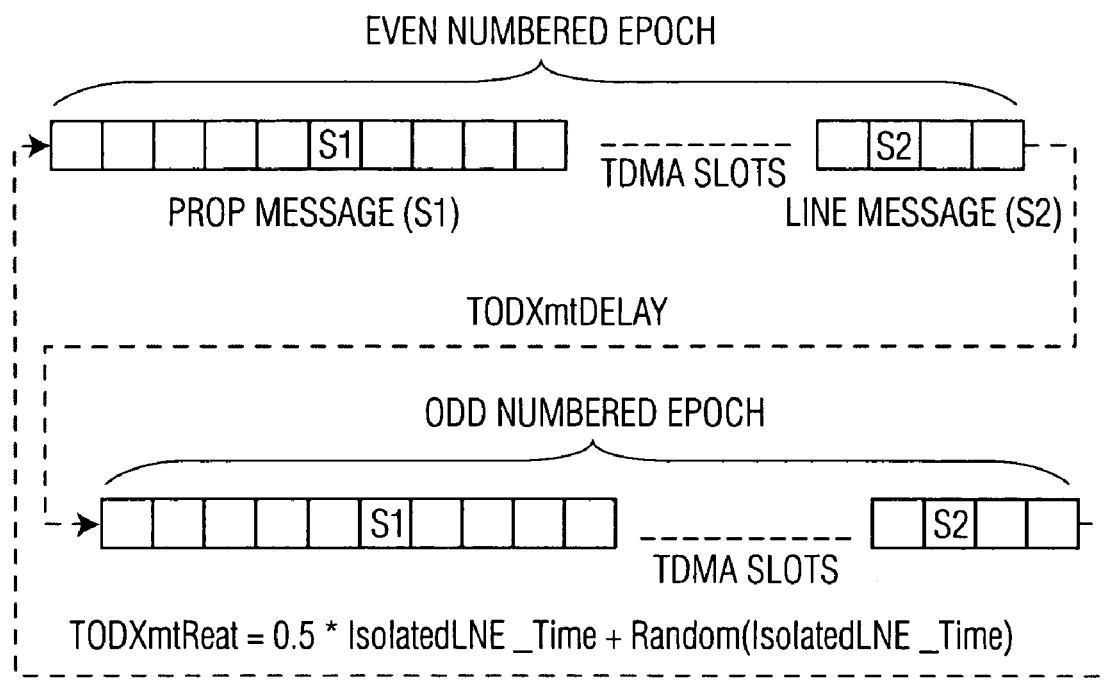
FIG. 1 is an exemplary time diagram of a TOD synchronization waveform transmitted by a node in a network when in an isolated status and attempting to join the network.

It will be appreciated that if an isolated node has GPS, then the node sets its own local clock time to GPS-based time and transmits PROP and LNE signals, as shown in FIG. 1. If this node does not become associated in a predetermined $T_{IN\_SYNC\_TIME}$ interval, then it listens for LNE signals from RF neighbors. If it receives the LNE message, then $RTC_{FLAG}$ is set to 1. This $RTC_{FLAG}$ indicates that the node with local GPS has set its local clock to the TOD received in a LNE message, and intends to join the net as soon as possible and then slowly cause the local net time to synchronize to GPS-based time. If an isolated node does not have GPS, then the node does not transmit LNE signals until a specified $T_{WAIT\_LNE\_TIME}$ interval expires, but nevertheless receives RF neighbor's LNE signals.

Figure 2:
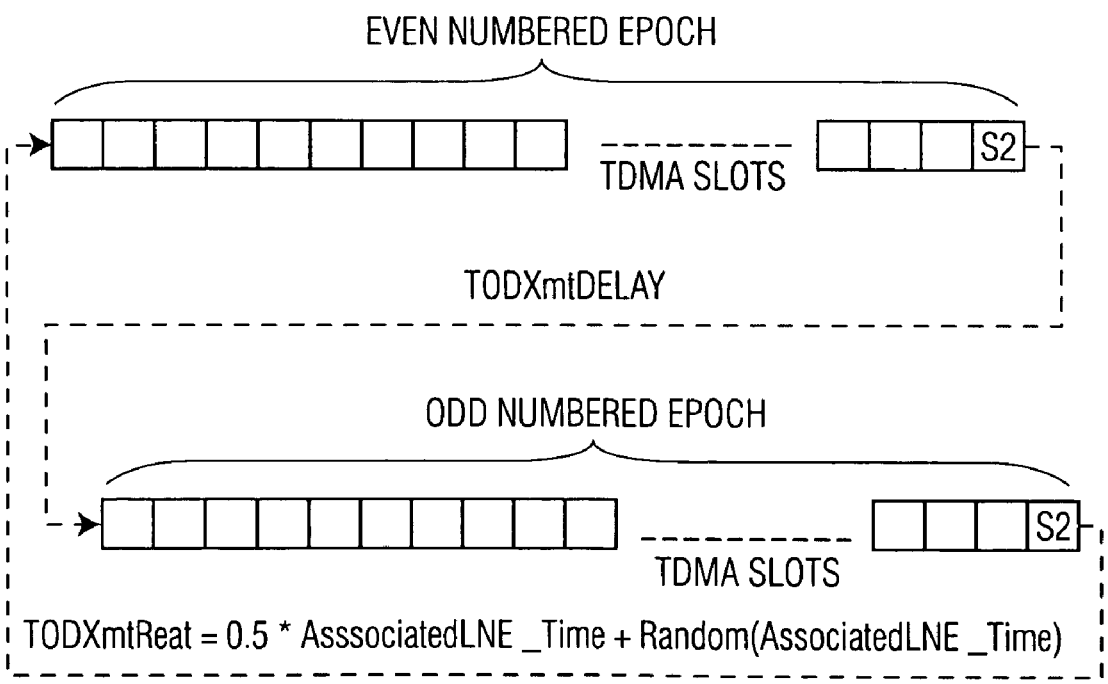
FIG. 2 is an exemplary time diagram of a TOD synchronization waveform transmitted by a node in a network after joining the network and achieving an associated status.

When a node receives a LNE signal from another node, the local clock is synchronized with the time information contained in that signal. This isolated node enters an in-sync state and starts to transmit PROP and LNE messages, as shown in FIG. 1 without delays (TODXmitDelay or TODXmtRepeat). When the in-sync node receives PROP or data messages, then this node becomes associated and is ready to communicate with its RF neighbors. The associated node then transmits LNE signals periodically, as shown in FIG. 2.

If the RTC_flag is set to 1 (or true) in the local node, then the local node slowly pulls the net time to GPS-based time. Otherwise, the neighbor's information is collected during a time window and the local node uses this information to update its local clock. The local clock time, the number of hops away from a GPS node and the "number of updates to GPS time count" are formatted in the TOD field and transmitted in a communications packet to neighbors.

It will be appreciated that ad-hoc networks use a synchronization scheme that allows synchronization between neighbors located one-hop away from each other. Consequently, the speed with which the timer value spreads is dependent on the number of nodes in the network and whether the nodes are able to directly communicate.

In general, the local clock time may be updated automatically when a node hears that there is a pulling activity from the neighbor(s). The goal of TOD synchronization is for all nodes to have identical net time. Preferably, that time may be GPS time, if any member node has valid GPS time information.

When a node with local GPS is isolated and attempts to synchronize with an existing net time that is not GPS-based time, the node sets its own local clock time to the TOD information in the received LNE packet in order to quickly synchronize with the net. The node then computes the number of updates to GPS time (NumUpdatesToGpsTimeCount) and adds this computed number to its own local TOD information. The number is computed as follows:

$$\text{NumUpdatesToGpsTimeCount} = \text{Integer}\{(t_{GPS} - t_{RTC})/\Delta t_{max}\} \quad (1)$$

where $t_{GPS}$ is the GPS (or real) time, $t_{RTC}$ is the local clock time, and $\Delta t_{max}$ is the maximum value of local clock time by which the local clock of a node may be updated, without losing its TOD synchronization with a neighbor(s) ($\Delta t_{max}$ may be 200 microseconds, for example).

The TOD packet contains the following information: (a) node ID, (b) island ID, (c) local clock time, (d) NHopsAwayGPSCount, and (e) NumUpdatesToGpsTimeCount and its sign.

Figure 6:
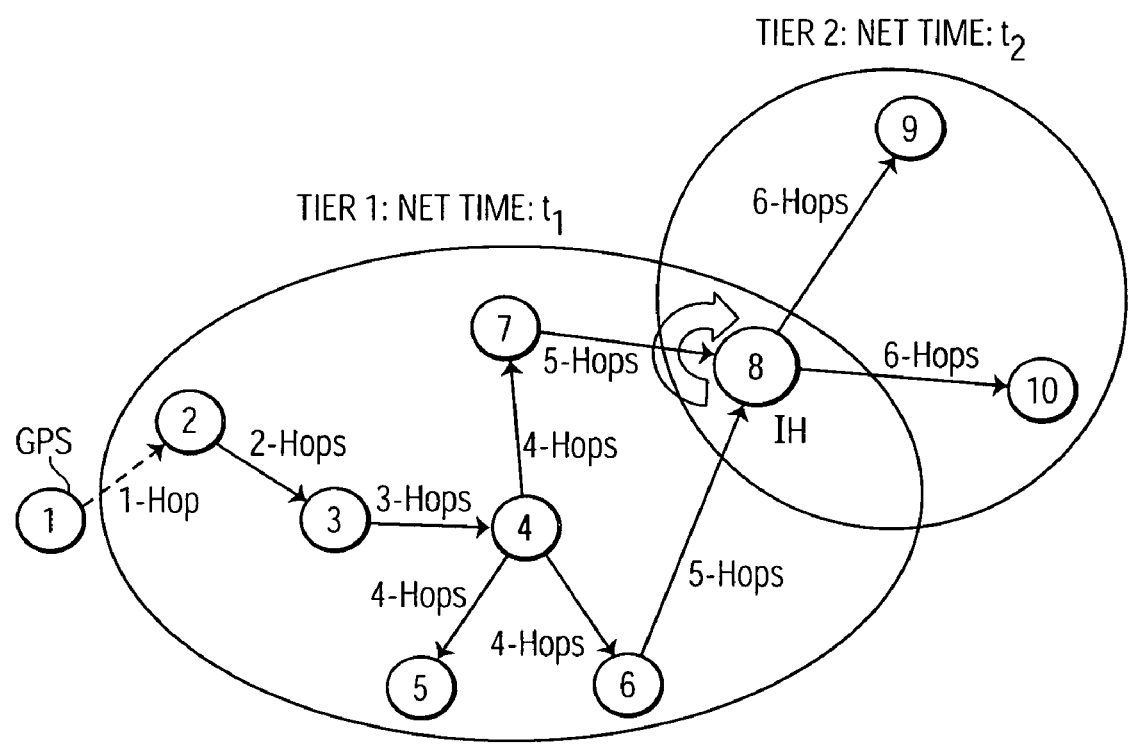
FIG. 6 is an exemplary block diagram depicting a group of nodes communicating in a first tier of a network and another group of nodes communicating in a second tier of a network, whereby node 8 is a bridging configuration having two nodes, one node communicates in the first tier and another node communicates in the second tier.

Each node computes the minimum number of hops away from a GPS node (NhopsAwayGpsCount) continuously when it receives TOD information from its neighbor(s). A node with local GPS declares its NhopsAwayGpsCount to be zero and each node receiving relayed GPS-based time information increases this count by one before relaying it to its next neighbor (as shown in FIG. 6, for example).

The positive value of NumUpdatesToGpsTimeCount may be replaced and its sign added to the TOD information. When the initial non-zero value of NumUpdatesToGpsTimeCount is received in a node from a neighbor(s), that value becomes the NumUpdatesToGpsTimeCount in that received node. The value of NumUpdatesToGpsTimeCount is thus decreased by one at the received node and is re-formatted for transmission as TOD information to another node, as shown in FIG. 3.

It will be appreciated that steps 412, 417, 418 and 419 shown in FIG. 4 represent TOD synchronization reception by a node, when using the flywheel synchronization method in accordance with an embodiment of the invention. When the initial non-zero value of NumUpdatesToGpsTimeCount is received from a neighbor(s), the very first value becomes the NumUpdatesToGpsTimeCount in a node. After the local clock time is updated by $\Delta t_{max}$, the NumUpdatesToGpsTimeCount is decreased by one and transmitted to other neighbor(s).

Figure 5:
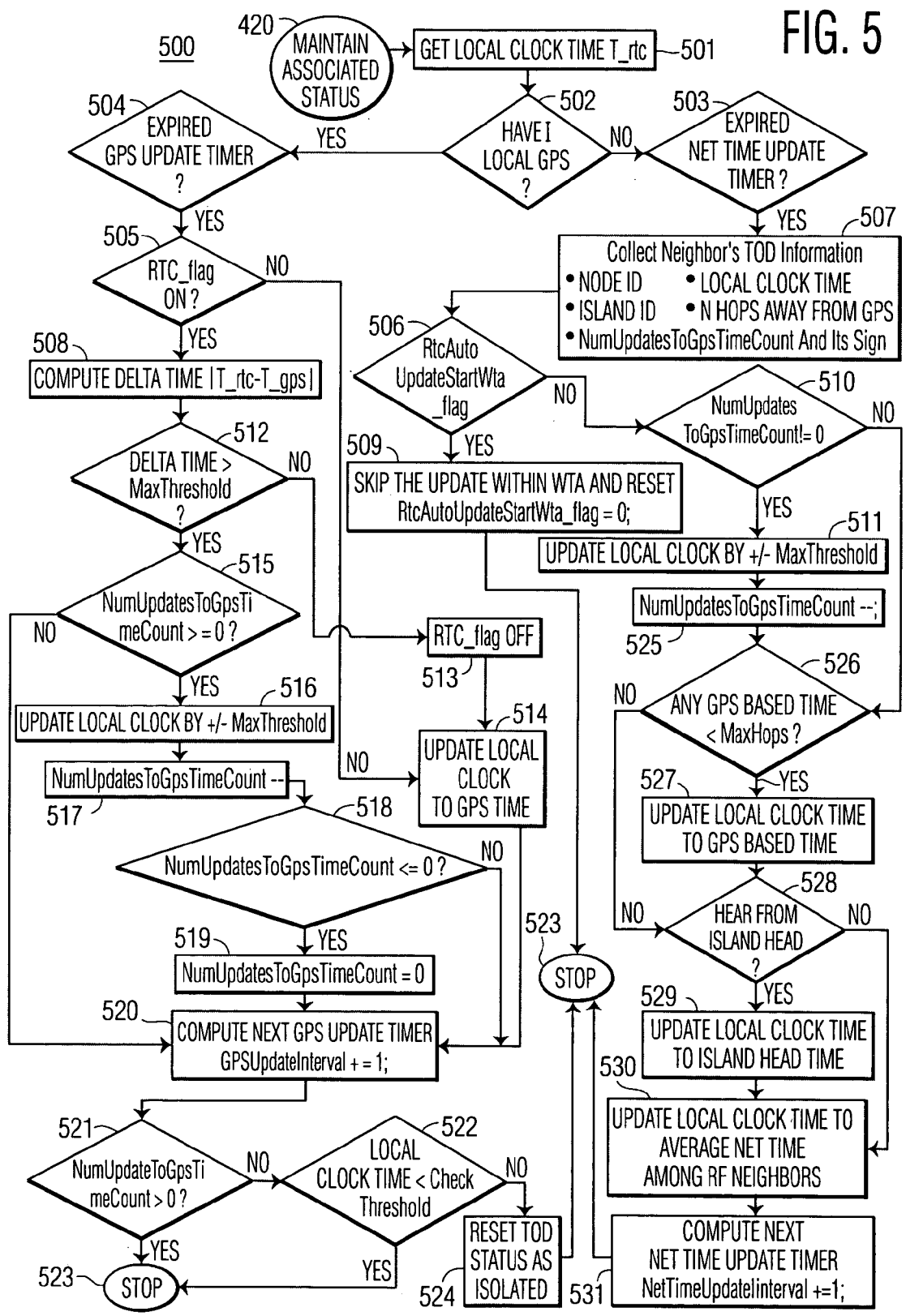
FIG. 5 is a flow diagram depicting a method performed by a node in a network for maintaining an associated status with other nodes in the network, in accordance with an embodiment of the invention.

Referring next to FIG. 5, there is shown a method of maintaining an associated status of a node, when using the flywheel synchronization method, in accordance with an embodiment of the invention. As will be explained, when the update interval expires, the local clock time (both of a node with local GPS and a node without local GPS) is updated by $\Delta t_{max}$ until NumUpdatesToGpsTimeCount becomes zero. These update intervals are the same for all nodes (for example, one second).

The method of maintaining an associated status in a node, generally designated as 500, starts at step 501 by obtaining the local clock time of the node. The method next determines whether the node has GPS-based time (step 502). If the node has GPS-based time, the method branches to step 504 and waits for a timer to expire (for example, expiration of a one-second update time interval). If the RTC_flag is ON (indicating pulling operation is occurring in the net), as determined by step 505, the method computes an absolute value of $(t_{GPS}-t_{RTC})$ representing delta time in step 508.

If the delta time is smaller than a maximum threshold value (for example 200 microseconds), as determined by step 512, the method sets the RTC_flag to OFF, updates the local clock of the node to GPS-based time, and waits for the next GPS update interval (steps 513, 514 and 520).

If the delta time, however, is greater than the maximum threshold value (step 512), and the "number of updates to GPS time count" is greater than or equal to zero, as determined by step 515, the method updates the local clock of the node by plus/minus the maximum threshold value (step 516) and decrements by one the "number of updates to GPS time count" of the node (step 517). If the "number of updates to GPS time count" is smaller than or equal to zero (steps 518 and 519), on the other hand, the method waits for the next GPS update interval (steps 520, 521, 522 and 523). Lastly, if the node does not hear from other nodes after a predetermined time interval expires (for example, 10 seconds) and the "number of updates to GPS time count" is not greater than zero (steps 521 and 522), the method resets its TOD status to isolated and stops (steps 523 and 524).

Returning to step 502, if the node does not have GPS-based time, the method branches to step 503 and waits for a net time update timer to expire (for example, a 1 second time interval). After the timer expires, the method collects the TOD information received from the neighbor node (step 507) and, if an RTCAutoUpdateStartWTA_flag is present (step 506), the method skips the update and resets the flag to zero (step 509). (This flag is described below.) If the flag is not present (e.g. the node is not part of a Warfighter's Tactical Associate (WTA), the method branches to step 510, and determines whether the "number of updates to GPS time count" is not equal to zero. If the count is not zero, the method in step 511, updates the local clock of the node by ± the maximum threshold value (for example ±200 microseconds). The "number of updates to GPS time count" of the node is then decreased by one integer value (step 525).

If the method determines that the count is zero (step 510), indicating that the network is free of any pulling, the local clock of the node is updated to GPS-based time (if available from a node that is less than a predetermined maximum number of hops away from a GPS-based time (for example, less than three hops away)) (steps 526 and 527). If the method determines that GPS-based time is not available (step 526), the local clock of the node is updated to the local clock time of the Island Head or the average net time among the neighbors (step 530). The method then increments the update timer by one (for example, 1 second) and stops (steps 531 and 523).

Having described TOD synchronization of a node in a net, TOD synchronization of a node that is in a WTA will now be described. It will be appreciated that a WTA includes two nodes (each having its own radio) that communicate with each other via Ethernet/USB. For purposes of discussion, these two nodes are referred to as a WTA local node and a WTA remote node. These two nodes exchange TOD information once per second via the Ethernet/USB. TOD status (isolated, in-sync, or associated) and GPS status (On, Off) information are exchanged between the two nodes. The local node decides if the local clock time should be updated, or not, based upon the received remote node information.

The WTA has an added responsibility of ensuring TOD synchronization exists between tiers 1 and 2. As shown in FIG. 6, the net time is in tier 1 is usually different from the net time in tier 2, when the associated nodes in tier 1 and the associated nodes in tier 2 do not have GPS-based time. As shown in FIG. 6, tier 1 includes nodes 2-8, and node 8 is one of the nodes (remote node or local node) of the WTA. Tier 2 includes nodes 8-10, and node 8 is one of the other nodes (remote node or local node) of the WTA. As an example, nodes 1 through 7 have Individual Warfighter Situation Awareness System (IWSAS) radios and reside in tier 1, and local node 8 in the WTA is designated as the island head to connect between tier 1 and tier 2. Remote node 8 is also in the WTA and is associated with nodes 9 and 10 in tier 2.

In the WTA, the value of NumUpdatesToGpsTimeCount is adjusted in the local node, when the first non-zero value of NumUpdatesToGpsTimeCount is received from the remote node in the WTA. The adjustment uses the following equation:

$$t_{GPS} = \text{LocalClockTime}_{wta} + \text{NumUpdatesToGpsTimeCount}_{wta} * \Delta T_{max}$$
$$\text{NumUpdatesToGpsTimeCount} = \text{Integer}\{(t_{GPS} - t_{RTC})/\Delta T_{max}\} \quad (2)$$

where $\text{LocalClockTime}_{wta}$ and $\text{NumUpdatesToGpsTimeCount}_{wta}$ are the received TOD information from the remote node in the WTA.

RtcAutoUpdatesStartWta_flag indicates the local clock time at which a node in the current tier (local node) starts the automatic updates with the newly computed NumUpdatesToGpsTimeCount, and the net time is pulled by the node with GPS time via the other tier (remote node). The first update is skipped since net time update occurs at every update interval (for example 1 second) and is the TOD information in a WTA is passed from the remote node to the local node via Ethernet/USB.

Figure 7:
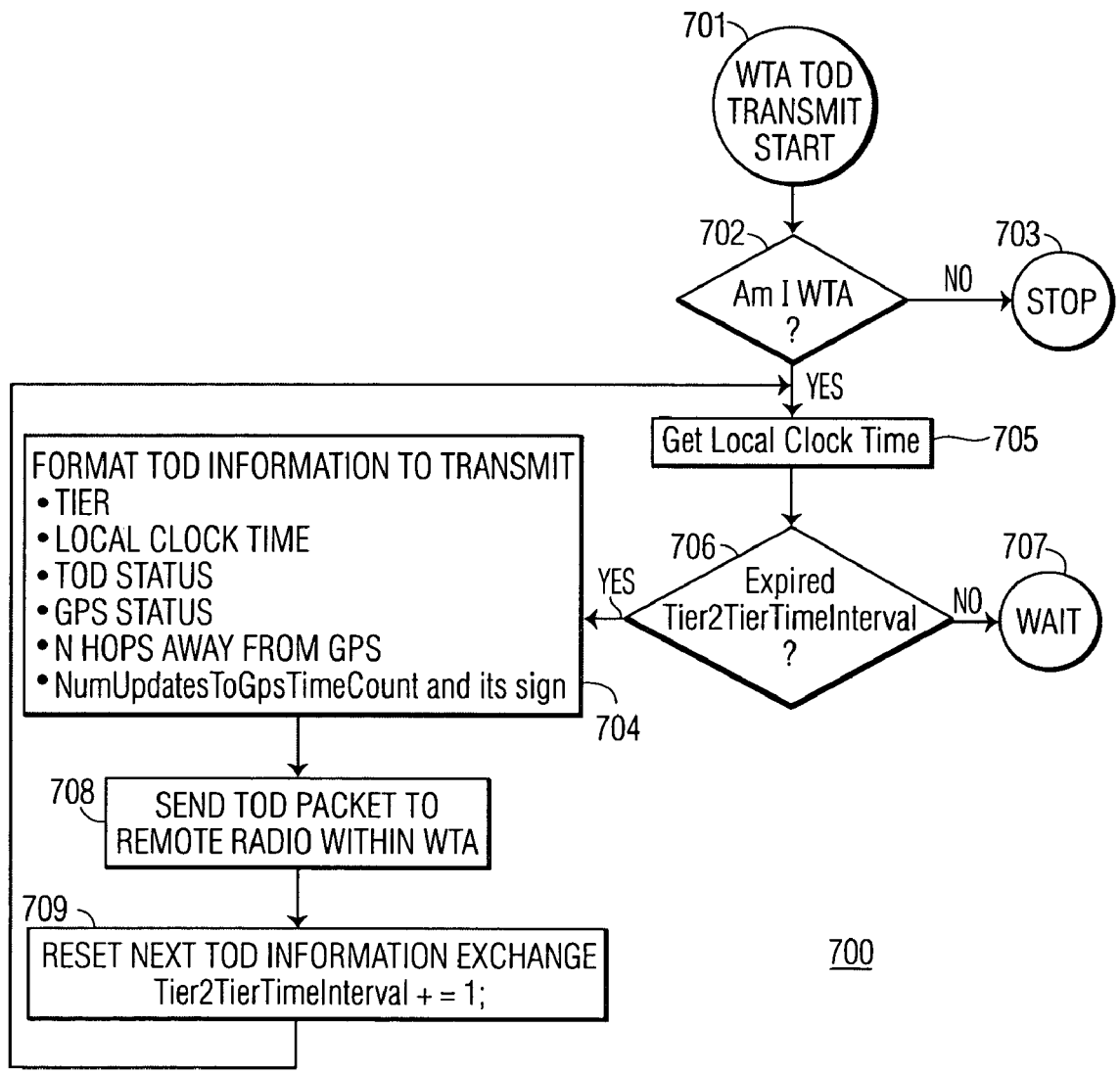
FIGS. 7 and 8 are flow diagrams depicting methods of exchanging TOD information between a local node and a remote node of a bridging configuration that communicates between a first tier and a second tier in a network, in accordance with an embodiment of the invention.
Figure 8:
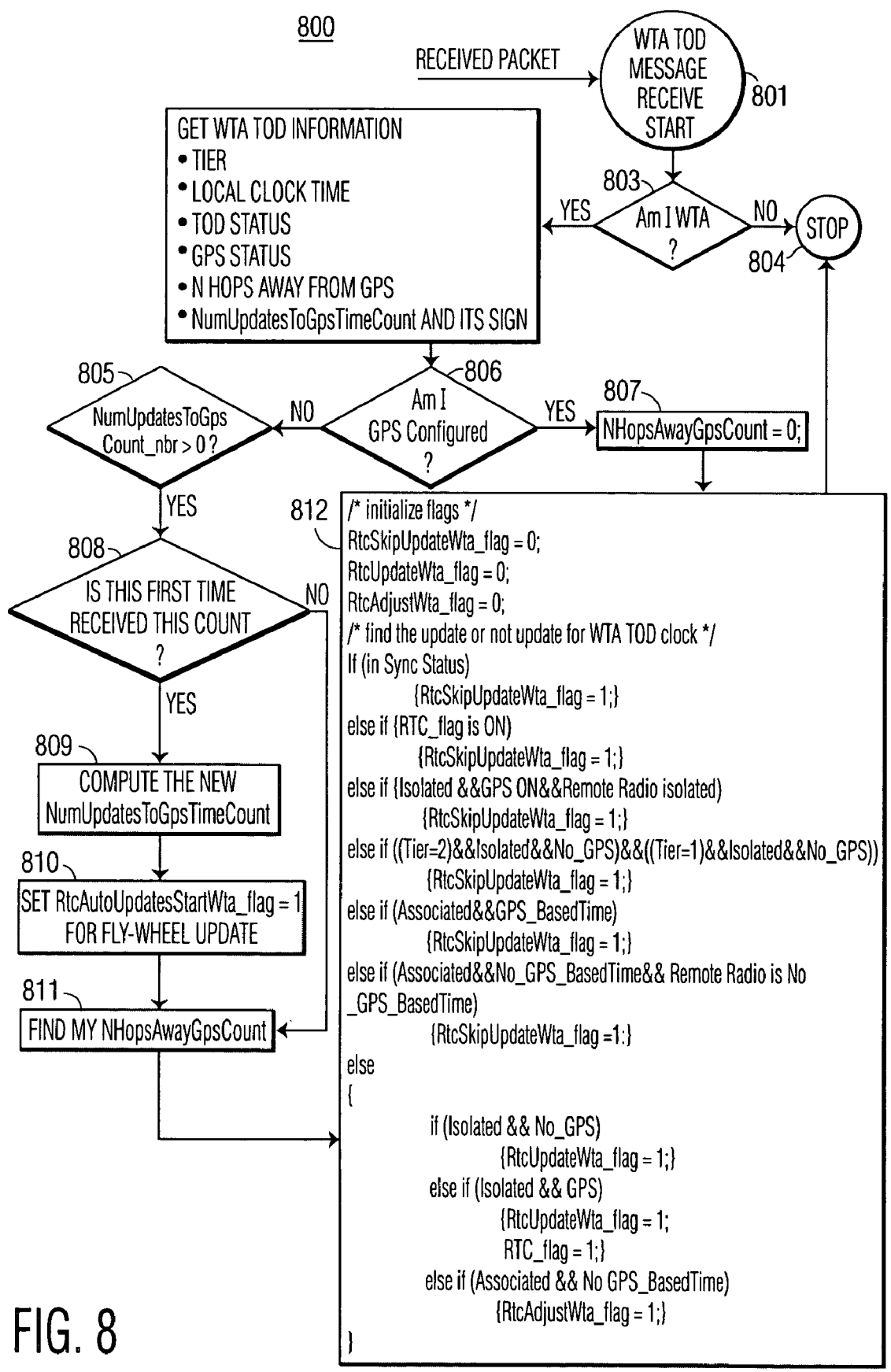
Figure 9:
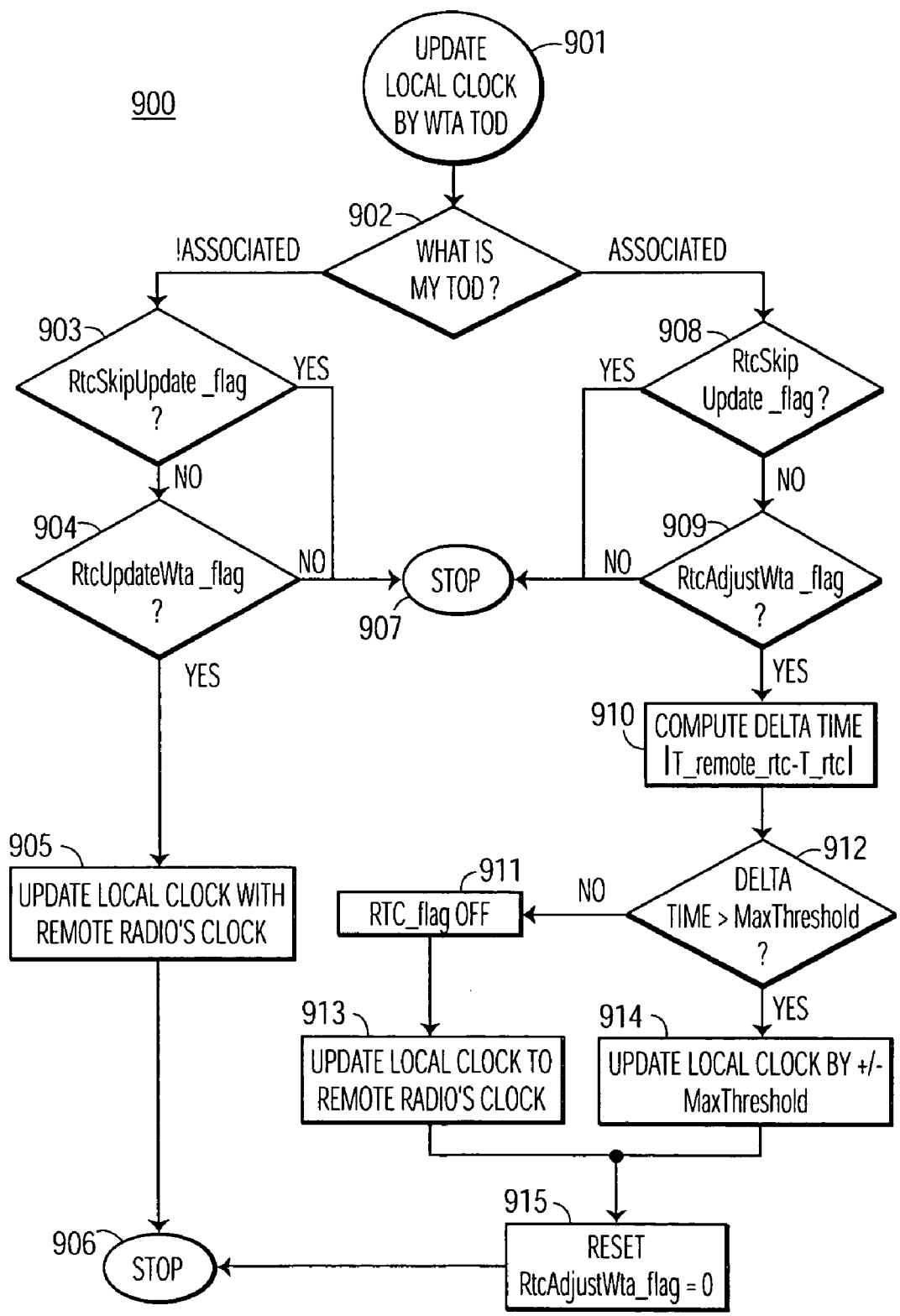
FIG. 9 is a flow diagram depicting a method of updating a TOD of the local node based on flags set by the methods of FIGS. 7 and 8, in accordance with an embodiment of the invention.

FIGS. 7-9 depict methods of TOD synchronization in a WTA. FIGS. 7 and 8 illustrate a method, according to an embodiment of the invention, for TOD information exchange between two nodes (remote node and local node) in a WTA. FIG. 9 illustrates a method, according to an embodiment of the invention, for local clock updates based on setting of flags, after TOD information is passed from the remote node to the local node. It will be appreciated that three flags are used to determine if the local clock updates in each node of the WTA is skipped or updated, as follows:

| | |
|---|---|
| (a) RtcSkipUpdateWta_flag | skip local clock updates |
| (b) RtcUpdateWta_flag | update local clock without local GPS |
| (c) RtcAdjustWta_flag | update local clock with local GPS |

Referring now to FIG. 7, a method of transmitting TOD information from one node to another node in the WTA will now be explained. It will be appreciated that the following description is with respect to one node (referred to as the local node) transmitting TOD information to the other node (referred to as the remote node). TOD information is also transmitted in the opposite direction (e.g. from the remote node to the local node). Exchange of TOD information is by way of a direct wire connection between the local and remote nodes, such as via the ETHERNET/USB.

The method, generally designated as 700, starts in step 701 and determines whether the local node is part of a WTA (step 702). If not part of a WTA, the method branches to step 703 and stops. If part of the WTA, however, the method obtains the local clock time of the local node and waits for a timing interval to expire (for example, 1 second interval) (steps 705, 706 and 707).

After the timing interval expires, as determined in step 706, the method branches to step 704. TOD information, including the local node's TOD and the "number of updates to GPS time count" and its sign, are formatted and transmitted by direct wire connection to the remote node (steps 704 and 708). The method resets the timer (step 709), loops back to step 705, and repeats the operation.

Referring next to FIG. 8, a method of receiving TOD information from one node to another node in the WTA will now be explained. Similar to the description of FIG. 7, the following description is with respect to one node (referred to as the local node) receiving TOD information from the other node (referred to as the remote node). The TOD information is received by direct wire connection.

The method, generally designated as 800, starts in step 801 and determines whether the local node is part of a WTA (step 803). If not part of a as WTA, the method branches to step 804 and stops. If part of the WTA, however, the method branches to step 802 and processes the received TOD information. The method next determines whether the local node includes GPS (step 806). If the local node includes GPS (for example, a GPS receiver or another source of obtaining GPS-based time), the method sets the "number of hops away from GPS" to zero (step 807) and sets the previously described three flags (step 812).

The three flags are set to determine whether the local TOD of the local node is to be (1) updated, (2) adjusted or (3) not adjusted (skipped), based upon the received TOD from the remote node. As shown in FIG. 8, step 812 sets the three flags. The three flags are set to decide if/how the local real time clock (RTC) is updated, based upon the received TOD messages from the other tier (remote node) via ETHERNET, as follows:

---

RtcSkipUpdateWta_flag
    If (local node is not ready to update the local TOD)
        Do not update the local TOD
RtcUpdateWta_flag
    If (local node is "isolated" and a positive
    NumUpdatesToGpsCount is received)
        Reset clock to other tier's TOD
    Also if (local node has a GPS)
        Set RTC_flag ON
RtcAdjustWta_flag
    If (local node is "associated" and local TOD time is not GPS based)
        Adjust local clock by maximum 200 μsec
It will be appreciated that update means replace local TOD with the received remote TOD, and adjust means adjust local TOD by 200 μsec.

---

Returning to step 806, if the local node is not GPS configured, the method branches to step 805 and determines whether the received "number of updates to GPS time count" is greater than zero and whether this count is a first-time received count (steps 805 and 808). It will be appreciated that a first-time received count greater than zero indicates that the remote node resides in a tier which includes GPS-based time and a node in that tier is in the process of pulling the nodes of that tier toward GPS-based time. After receiving such a count, the method enters step 809 and computes a new "number of updates to GPS time count". Next, the RTCAutoUpdatesStartWTA_flag is set to one (step 810) indicating that the local node is beginning flywheel updates and is in the process of pulling the TOD of nodes in its own tier (tier 1 or tier 2) toward GPS-based time. The method also sets the local node's "number of hops away from GPS" to the remote node's "number of hops away from GPS" (step 811). Finally, step 812 is entered and the three flags are set, as previously described.

Turning now to FIG. 9, there is shown method 900 for updating the TOD of the local node, based on flags set by method 800. The method begins at step 901 and determines (step 902) whether the local node has an associated status or a not-associated (isolated or in-sync) status in its own tier (tier 1 or tier 2). If the local node has a not-associated status, the method branches to step 903, and based on the flag settings, either skips the update (steps 903 and 907), or updates the local TOD of the local node to the received TOD of the remote node in the WTA (steps 904, 905 and 906).

Returning to step 902, if the method determines that the local node has an associated status with other nodes in its own tier (tier 1 or tier 2), the method branches to step 908, and either (1) skips the update (steps 908 and 907), (2) adjusts the update (steps 909, 910, 912, 914), or (3) fully updates (steps 911 and 913) based on flag settings performed by method 800.

It will be appreciated that step 910 computes delta time as the difference between the received remote TOD of the remote node and the local TOD of the local node. If the computed delta time is greater than a maximum update threshold (for example 200 microseconds), as determined by step 912, the method branches to step 914 and updates (or adjusts) the local TOD by the maximum update threshold (step 914). If the computed delta time is less than the maximum update threshold, however, the method branches to step 911 and 913 and sets the local TOD of the local node to the received remote TOD of the remote node. The method finally enters step 915, resets the RTCAdjustWTA_flag and stops (step 906). In this manner, the invention is effective in pulling the TOD of nodes in one tier toward the TOD of nodes in the other tier.

Figure 10:
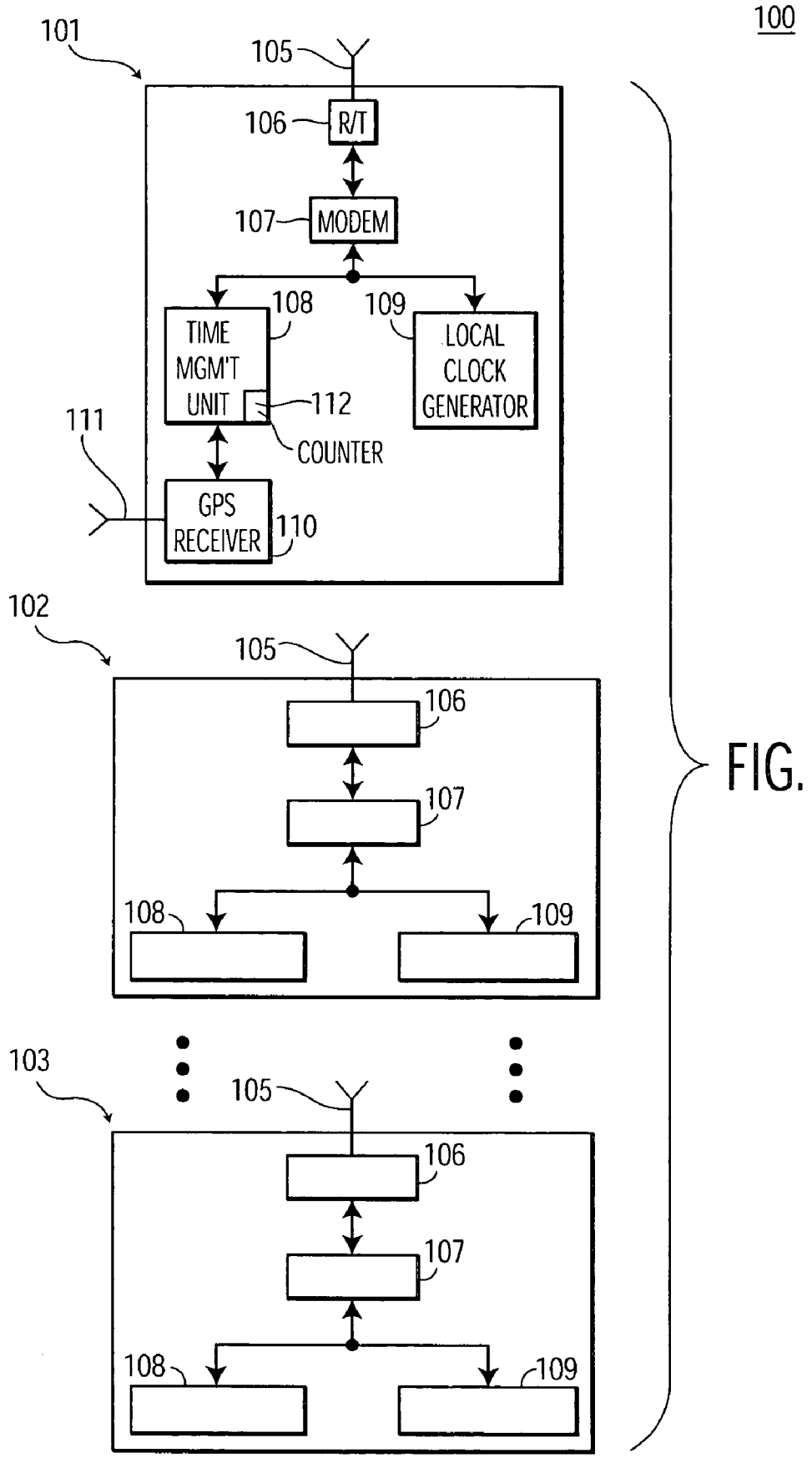
FIG. 10 is a block diagram illustrating an overall configuration of a communications network including multiple nodes, whereby each node includes components for executing methods of TOD synchronization, in accordance to an embodiment of the invention.

FIG. 10 is a block diagram illustrating an overall configuration of communication network 100, including nodes 101, 102 and 103. It will be appreciated that, in general, more than three nodes may be communicating in network 100. As shown, node 101 includes GPS-based time, obtained from GPS satellites and received in receiver 110 by way of antenna 111. Although the GPS receiver is shown internal to node 101, it will be appreciated that the GPS receiver may be a separate unit.

Node 101 generates a reference time by way of local clock generator 109, which may be adjusted or updated by time management unit 108 to generate a local TOD. The local TOD may be sent to receiver/transmitter 106, by way of modem 107, and transmitted onto the network by way of antenna 105.

Conversely, receiver/transmitter 106 may receive messages from a neighbor node (for example, node 1 or/and node 2). The received messages may include a TOD of a neighbor node, as well as other information previously described. The received neighbor TOD may be sent to time management unit 108, by way of modem 107. By having GPS-based time from receiver 110, a local TOD from clock generator 109 and a neighbor TOD from a neighbor node, time management unit 108 may provide the algorithms to implement the flywheel TOD synchronization methods, described previously, to update or adjust the local TOD.

It will be appreciated that time management unit 108 may be included in a microprocessor or a digital signal processor (DSP) coupled to a memory unit. The time management unit may also include counter 112 for computing an integer value corresponding to a number of update values for synchronization of the TOD of the node to the GPS-based time, as previously described. The counter may store an integer count value which may be set to a specific value or decremented by a value of one, as previously described. Although shown inside the time management unit, it will be understood that the counter may be external of the time management unit. A memory unit (not shown) may also be included for storing the integer count value, Tmax value and other parameters.

The remaining nodes in network 100, such as nodes 102 and 103, may include components similar to the components shown in node 101. It will be appreciated, however, that the remaining nodes in the network do not typically include a GPS receiver, because the network, in general, includes only one node that has GPS-based time.

Figure 11:
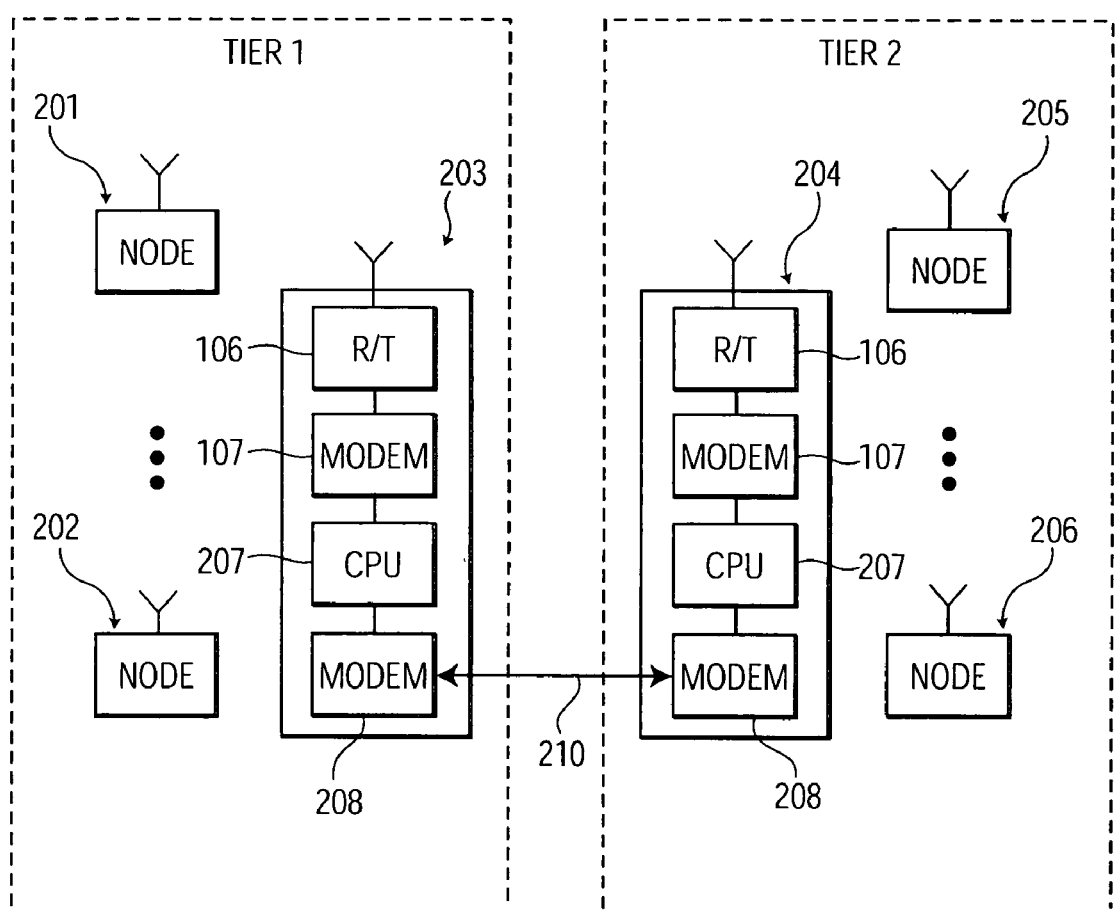
FIG. 11 is a block diagram illustrating an overall configuration of a communications network including multiple nodes operating in first and second tiers, whereby a bridging configuration of two nodes communicate by wired connection between the two tiers.

Lastly, FIG. 11 is a block diagram of communications network 200 including nodes 201, 202 and 203 operating in tier 1 and nodes 204, 205 and 206 operating in tier 2. As shown, the nodes have components similar to node 102 shown in FIG. 10. Any one of the nodes may also include a GPS receiver, similar to node 101 of FIG. 10.

Nodes 203 and 204, as shown, each include modem 208 interfacing with CPU 207 and a memory unit (not shown). Modem 208 may be an interface card providing an ETHERNET protocol with CPU 207. Nodes 203 and 204 may exchange information by direct wire 210 by way of respective ETHERNET cards. CPU 207 may include the time management unit, the counter and the local clock generator (shown in FIG. 10) and may execute the algorithms for providing the flywheel synchronization methods, as described before with respect to FIGS. 7-9.

Although the invention is illustrated and described herein with reference to specific embodiments, the invention is not intended to be limited to the details shown. Rather, various modifications may be made in the details within the scope and range of equivalents of the claims and without departing from the invention. For example, the update value may be a value other than 200 microseconds, such as 500 microseconds. The local and remote nodes described as being part of a WTA configuration may be any two nodes that exchange information between two tiers operating with different net times.

What is claimed:

1. In a wireless communications network having a plurality of nodes including local and neighbor nodes, each of the nodes having a time-of-day (TOD) and one of the nodes including a GPS-based time, a method of synchronizing a TOD of the local node to the GPS-based time, the method comprising the steps of:

(a) storing, in the local node, an update value for adjusting a TOD of the local node without losing time synchronization with a TOD of the neighbor node;
    (b) receiving, in the local node, from the neighbor node, a first integer value corresponding to a number of update values for synchronization of the TOD of the neighbor node to the GPS-based time; and
    (c) updating, in the local node, the TOD of the local node by the update value stored in step (a), after receiving the first integer value in step (b);
    wherein the first integer value is based on the following:
    Integer $\{t_{GPS}\text{-}t_{RTC})/\Delta t\}$
    wherein $t_{GPS}$ is the GPS-based time,
    $t_{RTC}$ is the TOD of the local node, and
    $\Delta t$ is the update value.

2. The method of claim 1 further including the steps of:
    (d) storing, in the local node, a second integer value; and
    (e) decrementing, in the local node, the second integer value stored in step (d), after updating the TOD of the local node in step (c);
    wherein the second integer value corresponds to a number of hops the neighbor node is from the GPS node.

3. The method of claim 2 including the steps of:
    after receiving the first integer value in step (b), determining whether the received first integer value is greater than zero; and
    step (e) includes decrementing the second integer value, if the received second integer value is greater than zero.

4. The method of claim 1 wherein storing in step (a) is limited to storing a Tmax value corresponding to a maximum update value without losing time synchronization with the TOD of the neighbor node.

5. The method of claim 1 including the steps of:
    after receiving the first integer value in step (b), determining whether the received first integer value is a first-time received integer value; and
    storing, in the local node, a second integer value equal to the received first integer value, if the received first integer value is the first-time received integer value.

6. The method of claim 1 wherein the local node and the neighbor node communicate in a first tier having a first net time, and a remote node communicates with other nodes in a second tier having a second net time, the second net time different from the first net time, the method further including the steps of:
(d) storing, in the local node, a second integer value based on the received first integer value;
(e) directly sending by a wired connection, from the local node to the remote node, the local TOD updated in step (c) and the second integer value stored in step (d);
(f) receiving, in the remote node, the local TOD and the second integer value directly sent in step (e);
(g) computing, in the remote node, a third integer value corresponding to a number of update values for synchronization of a TOD of another neighbor node in the second tier to the GPS-based time; and
(h) transmitting, from the remote node to the other neighbor node, the third integer value computed in step (g) for synchronization of the TOD of the other neighbor node.

7. The method of claim 6 further including the step of:
(i) updating, in the remote node, a TOD of the remote node by the update value, after receiving the local TOD and the second integer value in step (f).

8. In a wireless communications network having a plurality of associated nodes including a neighbor node, each of the associated nodes having a time-of-day (TOD), a method of synchronization a TOD of the neighbor node to a GPS-based time of a first node entering the network, the method comprising the steps of:
(a) storing, in the first node, an update value for adjusting a TOD of the neighbor node without losing time synchronization with a TOD of another node in the network;
(b) receiving, in the first node, from the neighbor node, a message including a TOD of the neighbor node;
(c) computing, in the first node, an integer value corresponding to a number of update values for synchronization of the TOD of the neighbor node to the GPS-based time;
(d) setting a local TOD, in the first node, to the received TOD of the neighbor node; and
(e) transmitting, from the first node, the local TOD set in step (d) and the integer value computed in step (c) for synchronization of the TOD of the neighbor node of the GPS-based time wherein step (c) includes computing the integer value based on the following:

NumUpdatesToGpsTimeCount=Integer $\{t_{GPS}-t_{RTC})/\Delta t_{max}\}$ wherein $t_{GPS}$ is the GPS-based time,
$t_{RTC}$ is the local TOD,
$\Delta t_{max}$ is a maximum update value, and
NumUpdatesToGpsTimeCount is the integer value.

9. The method of claim 8 further including the step of:
(f) changing status, in the first node, from an isolated status to an associated status for indicating that the first node is associated with the neighbor node.

10. The method of claim 8 including the step of
(f) setting a flag, in the first node, indicating that the TOD of the neighbor node is being pulled toward the GPS-based time.

11. The method of claim 8 wherein
step (c) includes determining whether the GPS-based time leads or lags the TOD of the neighbor node; and
step (e) includes transmitting a sign indicating that the GPS-based time is one of leading and lagging the TOD of the neighbor node.

12. The method of claim 8 further including the steps of:
(f) if the integer value computed in step (c) is greater than zero, updating the local TOD by the update value; and
(g) decrementing the integer value by one, if the integer value is greater than zero.

13. The method of claim 8 wherein the first node and the neighbor node communicate in a first tier having a first net time, and a second node communicates with other nodes in a second tier having a second net time, the second net time different from the first net time, the method further including the steps of:
(f) directly sending a wired connection, from the first node to the second node, the local TOD set in step (d) and the integer value computed in step (c);
(g) receiving, in the second node, the local TOD and the integer value directly sent in step (f);
(h) computing, in the second node, another integer value corresponding to a number of update values for synchronization of a TOD of another node in the second tier to the GPS-based time; and
(i) transmitting, from the second node to the other node, the other integer value computed in step (h) for synchronization of the TOD of the other node to the GPS-based time.

14. The method of claim 13 further including the step of:
(j) updating, in the second node, a TOD of the second node by the update value, after receiving the local TOD and the integer value in step (g).

15. A wireless communications network including a plurality of nodes, and one of the nodes having a GPS-based time for synchronization of time-of-day (TOD) in the network, comprising at least a local node and a neighbor node communicating in the network,
a clock generator in the local node for generating a local TOD,
a time management unit in the local node coupled to the clock generator for adjusting the local TOD by an update value, and
a receiver in the local node for receiving from the neighbor node a neighbor integer value corresponding to a number of update values for synchronization of the neighbor TOD to the GPS-based time,
wherein after the receiver receives the neighbor integer value, the time management unit updates the local TOD by the update value if the neighbor integer value is greater than zero, and
the neighbor integer value is the following:

NumUpdatesToGpsTimeCount=Integer $\{t_{GPS}-t_{RTC})/\Delta t\}$ wherein $t_{GPS}$ is the GPS-based time,
$t_{RTC}$ is the local TOD,
$\Delta t$ is an update value, and
NumUpdatesToGpsTimeCount is the neighbor integer value.

16. The communications network of claim 15 wherein the update value is limited to a Tmax value for maintaining time synchronization with at least the neighbor TOD.

17. The communications network of claim 15 including a counter in the time management unit for storing a local integer value,
wherein after updating the local TOD by the update value, the counter decrements the local integer value by one.

18. The communications network of claim 15 including a counter in the time management unit for storing a local integer value, wherein after updating the local TOD by the update value, the counter sets the local integer value to the neighbor integer value, if the receiver receives the neighbor integer value for the first time.

19. A wireless communications network including a plurality of nodes, and a local node having a GPS-based time for synchronization of time-of-day (TOD) in the network, comprising at least the local node and a neighbor node of the plurality of nodes communicating in the network, a clock generator in the local node for generating a local TOD, a time management unit in the local node, coupled to the clock generator, for adjusting the local TOD, a receiver in the local node for receiving from the neighbor node a message including a neighbor TOD, a counter in the local node for computing and providing an integer value corresponding to a number of update values for synchronization of the neighbor TOD to the GPS-based time, and a transmitter in the local node for transmitting to the neighbor node the integer value provided by the counter, wherein after the receiver receives the message, the time management unit transmits the integer value to the neighbor node for synchronization of the neighbor TOD to the GPS-based time, and the integer value is the following:

NumUpdatesToGpsTimeCount=Integer $\{(t_{GPS}-t_{RTC})/\Delta t\}$ wherein $t_{GPS}$ is the GPS-based time.

$t_{RTC}$ is the local TOD, $\Delta t$ is an update value, and

NumUpdatesToGpsTimeCount is the integer value.

* * * * *